Jan. 10, 1961 G. PETERSON 2,967,994
CASING JOINT LOCATOR
Filed March 25, 1957 3 Sheets-Sheet 2

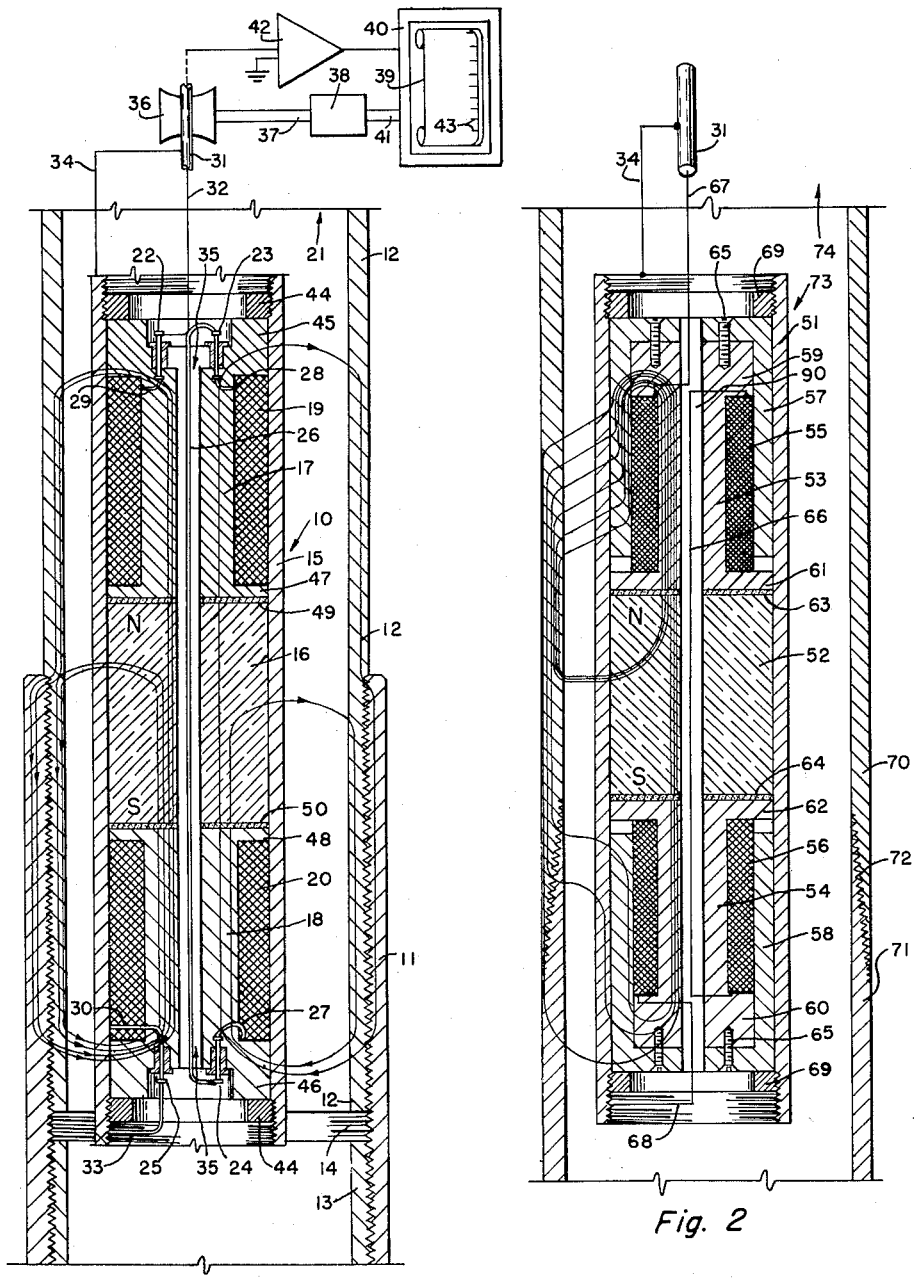

INVENTOR.
Glen Peterson
BY
Robert K. Schumacher
ATTORNEY

Jan. 10, 1961

G. PETERSON 2,967,994

CASING JOINT LOCATOR

Filed March 25, 1957

INVENTOR.
Glen Peterson

BY
Robert K. Schumacher

ATTORNEY

United States Patent Office 2,967,994
Patented Jan. 10, 1961

2,967,994

CASING JOINT LOCATOR

Glen Peterson, Tulsa, Okla., assignor to Well Surveys, Incorporated, a corporation of Delaware Filed Mar. 25, 1957, Ser. No. 648,131

14 Claims. (Cl. 324—37)

This invention pertains to apparatus for locating the joints between adjoining sections of casing or tubing which usually lines a borehole in the earth. It particularly relates to improved apparatus for finding and locating such joints by means of the magnetic field variations introduced in steel casing at the joints and other magnetic irregularities.

Magnetic types of casing collar or joint locators are not new to the arts of well logging, gun perforating and such other allied arts and services that require accurate depth marks in cased boreholes below the surface of the earth. In one form or another they have been used for a great many years. It is well known that the cable used to lower an instrument in a well stretches considerably, and when such cable is also used exclusively to establish the dept of the instrument in the well, considerable inaccuracies may result. To overcome this deficiency a casing collar locator is often carried with other well surveying and logging instruments, and by means of it and the other surveying and logging instruments the positions of earth formations are established with respect to the nearest casing joints or collars.

Generally, the casing collar detectors of the known art have been characterized by one or more weaknesses. The earliest forms of such apparatus were large and bulky and often so insensitive that it was necessary to maintain the magnetic pole pieces which they employed in close proximity to the casing. With the introduction of heavy drilling muds and the resulting mud cakes which sometimes lined the casing walls, contact between the casing walls and the collar detector were often impossible and many collars were missed by these early detectors. Some of the casing collar detectors which have been used are also characterized by relatively long response patterns with the result that collars might be located with an uncertainty of a foot or more. When producing formations, such as in oil and water wells, are many feet thick an uncertainty of a foot or two may be important. But as the search for oil gets more and more difficult, relatively thin streaks of production, heretofore missed, become of considerable importance and depth measurements must be correspondingly more accurate for proper production.

Again, the older forms of casing use thick heavy collars to join casing sections together, and in addition to the added thickness of magnetic material introduced by the collar, large gaps are often left, inside a collar, between casing section ends. Such casing collars and gaps are relatively easy to find compared with the newer flush type joints which provide neither a collar nor an appreciable gap between casing section ends. All that is provided is a relatively short region where two pieces of casing are threaded tightly together. Many locators which are able to find the old-fashioned collars fail miserably to indicate the presence of the flush type joints.

To reduce well completion costs, many wells today are completed with what is known as tubing. This tubing is often of the order of two inches in diameter, and down to or near the production zone, tubing is used to encase the well, but below the tubing, regular casing of six, eight or more inches in diameter is used. This, in turn, requires that the well logging instrument, including the casing collar and joint detector, not exceed one and three-quarter inches in diameter; and sometimes a smaller well logging instrument must be used. Since instrument housings capable of withstanding the great hydrostatic pressures which exist at the bottom of a deep well must be employed, it often happens that the actual space available for instrumentation is an inch, or less, in diameter. It is exceedingly difficult to put within such space, a casing collar and joint detector which can detect a flush type joint both in small diameter tubing and when centered in six or eight inch diameter casing, as when the instrument emerges from the bottom of the tubing section into the cased section. However, these conditions must be met.

Most collar locators which have been use heretofore are of the two-magnet variety and employ one or more pickup coils. The magnets are deployed to produce within a region which includes the pickup coils and a portion of the casing two opposing magnetic fields. This is sometimes done in instruments having axially aligned components by having two permanent magnets arranged in opposing relation.

The two-magnet detector has served the industry well for several years, but it usually requires that the detector be unnecessarily long, and it often does not otherwise conserve space. Too, it is subject to high leakage fluxes which sometimes give rise to spurious collar patterns and to loss of signal since part of the flux is dissipated in regions where it can do no good. Some two-magnet detectors also do not fill all of the space allotted to them with useful material, and while this may not be serious in detectors of large size, it is vital in the small diameter instruments.

The present invention provides a new and improved casing collar and joint detector, of the magnetic type, that is free from the weaknesses and deficiencies of the prior art. It is sensitive to the smallest conceivable magnetic anomalies found in casing even at relatively large distances from the casing walls. It is extremely sturdy, easy and economical to manufacture, and very reliable in operation. By its use all types of casing joints from old-fashioned collars to flush or streamline joints may be located with equal facility. It may be readily lowered into a borehole alone or with other instruments, for example, with radioactivity well logging equipment or gun perforators, and it can be located in any position whatever within the entire instrument string. It can withstand the shock produced by the perforating operation, and its signals can be sent to the surface in any so-called single-conductor logging and hoisting cable along with other signals.

In accordance with the invention, circular geometry is used throughout and all of the allotted space filled with useful material. The detector armature, comprised of coils and ferromagnetic core and hitherto fabricated in one piece, is split through the middle and a sing'e cylindrical magnet interposed between the two armature halves. The simple arrangement of the vital parts of the detector of the present invention gets rid of practically all of the leakage flux and at the same time causes what little leakage flux that remains to flow in a central region near the magnet where it can do no harm. Furthermore, the use of a single magnet, common to two magnetic circuits which must be accurately balanced when the casing is uniform, makes it extremely simple to produce a balance which can be maintained over long periods of time. Hitherto, when two magnets were used, the magnets had to produce identical fluxes, and these fluxes had to remain identical in order that the two magnetic circuits be balanced. Since all magnets age with use, and particularly is this so in boreholes where the magnets are often put through large temperature cycles and sometimes subjected to large demagnetizing forces, it is virtually impossible to keep a two-magnet system accurately balanced.

Again, with the two-magnet system, the leakage fluxes need to remain in balance in order that the two magnetic circuits be balanced. This places an extra constraint on all the other parts and pieces comprising each magnetic circuit. Since with the single magnet system, there is practically no leakage to start with and what little occurs is symmetrically disposed about the single central magnet, leakage unbalances are not a problem.

Having reduced the magnetic circuits to a single common magnet, it is only necessary to fabricate the armature halves with reasonable care and wind each with an identical number of turns in order to have a highly balanced system. Neither of these things is difficult or costly.

Further in accordance with the invention armature shells have been added which cover most of the coils with ferromagnetic material whereby the effective length of the detector is reduced to less than its actual length and whereby leakage flux is again reduced. The use of these armature shells is made possible by virtue of the single magnet arrangement. If two magnets were used in the usual way at opposite ends of an armature, and shells were then put around armature and magnets, the shells would virtually short-circuit the magnets.

An object of the invention is to provide a new and improved apparatus for accurately locating the joints between adjacent casing section ends of all types and sizes of casing and tubing used to line a borehole drilled into the earth.

A second object is to provide a casing joint locator of the magnetic variety which has the highest possible ratio of useful to leakage magnetic flux.

A third object is to provide a casing collar and joint detector having a very short signal response pattern so that casing joints may be located with an accuracy of half a casing diameter, half a collar length or half a detector length, whichever is the least.

A further object is to provide a casing collar and joint detector which completely fills the cylindrical space allocated to it and has the ultimate in sensitivity.

Another object is to provide a casing collar and joint detector composed of minimum numbers of coils and magnets.

An additional object is to provide a casing collar and joint detector that is capable of going through small tubing in the upper portions of the borehole and of finding collars in cased lower borehole regions of considerably larger diameter.

A further object is to provide a casing collar and joint detector which can be wound to couple into very low or high impedance circuits without affecting the basic vital properties of the detector.

Still another object is to provide a casing collar and joint detector having an extremely large dynamic range: one having a high signal to noise ratio where very weak magnetic anomalies must be located, yet which does not overload on extremely strong signals.

An additional object is to provide a casing collar and joint detector having a high ratio of response to collar and joint signals vs. the response to lateral motion in the borehole.

The invention may be better understood by referring to the following detailed description made in conjunction with the drawings, wherein:

Figure 1 is primarily a cross-sectional view of one embodiment of the casing collar locator of the present invention, shown positioned in casing near a casing collar, and also in schematic relation to other auxiliary apparatus required in the casing collar location service.

Figure 2 is also a cross-sectional view showing a modified embodiment of the present invention, with the detector positioned in casing in the vicinity of a streamline joint.

Figure 4:
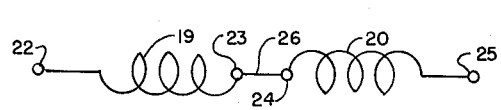
Figure 4 is a schematic diagram showing the relationship of the coils in the detector of the present invention.

Referring to Fig. 1 where a casing joint detector assembly 10 is shown in cross-section in a typical situation adjacent a casing collar 11 which joins two sections of casing 12 and 13 together leaving a gap 14. The detector assembly 10 is comprised of a non-magnetic housing 15, a permanent magnet 16, two identical armature halves 17 and 18 which are wound, respectively, with identical coils 19 and 20. As illustrated in Fig. 1, and more completely in Fig. 9, flux flows from the north pole of magnet 16 through armature 17, out into casing 12, into collar 11, back across casing 12 and returning through armature 18 to the south pole of magnet 16. Due to the presence of collar 11 and the consequent increased permeance of the external circuit of the lower half of the detector, additional flux lines flow out of the central region of magnet 16 and into the casing as shown. These flux lines do not flow through armature 17 and hence do not link coil 19. They flow only through armature 18 where they link coil 20. When detector assembly 10 is in vertical motion with respect to casing 12 and collar 11, as indicated by arrow 21, the flux linking the respective coils varies as a joint is passed, and more voltage is induced in one coil than is induced in the other coil, and hence a net voltage is produced across terminals 22 and 25. As can be seen in Fig. 1, and as more clearly portrayed in Fig. 4, the two coils, 19 and 20, are connected in series and poled to buck each other. That this is so can be better understood when it is remembered that coils 19 and 20 are identical. This not only means that the two coils have an identical number of turns of the same size wire wound in an identical number of even layers on their armatures, but also in an identical direction. Thus, since the beginning of winding 20 is connected to terminal 24, as shown by winding end 27, and the end of winding 19 is connected to terminal 23, as shown by winding end 28, and since terminals 23 and 24 are connected together by conductor 26, and the two coils and armatures are turned over with respect to each other and placed at opposite poles of magnet 16, it is clear that opposite voltages are induced in the respective coils since the flux from a single magnet can flow through the armatures in one direction only.

Figure 8:
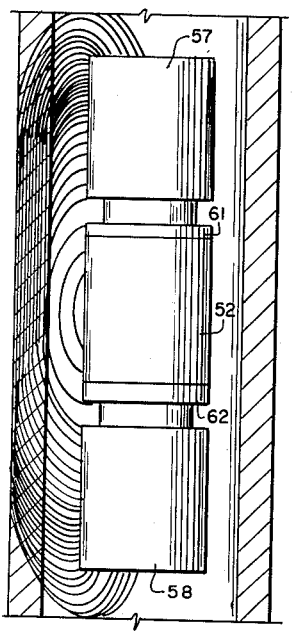
Figure 8 is a drawing in partial cross-section illustrating the pattern of flux lines when the detector of Fig. 2 is situated within a uniformly cased well.

When the detector is wholly situated within uniform steel casing, as shown in Fig. 8, the permeance of the external magnetic circuit is everywhere the same, and since the permeances of the armatures have been purposely made as identical as it is possible to make them, the magnetic system of the detector is uniform and symmetrical, end to end, and no flux flows into or out of the central region of magnet 16. The entire flux, except for leakage, flows through a single magnet circuit which includes both armature halves when no joints or collars are present; but in the presence of a collar or joint that is closer to one end of the detector than the other, the flux breaks up and flows in two magnetic circuits with one armature included in both flux paths and the other armature included in only one flux path.

Referring again to Fig. 1, it is seen that terminal 22 is connected to beginning end 29 of winding 19, while terminal 25 is connected to concluding end 30 of winding 20. It is also seen that terminal 22 is connected to the central conductor of cable 31 by means of conductor 32, and terminal 25 is grounded to housing 15 by means of conductor 33. Similarly, the external sheath of cable 31 is grounded to housing 15 by means of conductor 34. This completes the casing joint detector circuit into the cable. 35 is a central passage-way through the detector for carrying conductor 26 as well as for conveying connections between cable 31 and other apparatus that may be situated below the detector. Again, conductor 32 may be broken and other apparatus connected between the broken ends.

Passing to the apparatus located at the surface of the borehole, there is typically included a depth measuring sheave 36 over which cable 31 passes, as it goes in and out of the well, and which it rotates in accordance with the motions thereof; 37 is a shaft to which 36 is secured and which connects to transmission system 38, which usually includes a synchro link for convenience, and which drives chart 39 of recorder 40 by means of shaft 41. The upper terminus of cable 31 is preferably connected to an amplifier 42 by means of which the casing joint signals may be amplified as required. The amplifier is, in turn, connected to a pen, stylus, or galvanometer in recorder 40 by means of which typical marks 43 are made on record 39 indicating the location of the casing joint with respect to the record and with respect also to other logs that might simultaneously be applied to the record.

While with large old-fashioned collars casing joint signals have sufficient amplitude to be recorded directly are produced, it is generally desirable to include an amplifier in the system so that the weaker signals that are produced by streamline or flush-type joints, or when a small diameter detector is centered, or nearly centered, in a large diameter casing, may be amplified to a level appropriate for reliable recording. Again, it is useful to include an amplifier in the system so that the recording level may be appropriately controlled. As previously mentioned, the casing joint signals occur over a very large dynamic range since logging speeds having a range of at least 10:1 are used and the range may easily be 100:1, since streamline joints produce signals at least 10 times smaller than old-fashioned collars, since the signals produced by a small detector going through tubing will be at least 10 times larger than the signals produced when the small detector enters casing below the tubing, it is easy to see that the dynamic range is at least 1000:1, and if gun perforation services are included, the dynamic range is at least 10,000:1. The usual recorder will not accommodate such a range of signals; hence it is generally desirable to include an amplifier having both manual and automatic volume controls.

Returning to the subsurface apparatus shown by Fig. 1, the armature halves 17 and 18 have pole pieces 45 and 46, respectively, from which most of the external magnetic flux emanates. These pole pieces have a length consistent with keeping the overall detector length as short as possible and the permeance into the casing as large as possible. The armatures 17 and 18 also have pole faces 47 and 48, respectively, by means of which armatures and magnet are fastened together at joints 49 and 50, and by means of which all of the flux magnet 16 is capable of producing gets into the armatures and links the coils. The thickness of these pole faces should be as thin as possible, consistent with getting all of the flux out of the magnet and into the armature neck, and with keeping the leakage from pole face to pole face as low as possible. Ideally, these pole faces should have sloping edges, since the amount of flux each pole face has to carry from the magnet gets less and less with increasing diameter, while the leakage increases with pole face area. But giving the pole faces a sloping edge greatly increases the problem of insulating that end of the winding from the armature so that the little that is gained in decreasing leakage is scarcely worth the price that has to be paid.

Armatures and magnet are preferably fastened together by means of epoxy type cements; for example, Conley Weld as manufactured by the Ed. Conley Co. of Tulsa, Oklahoma. These epoxy cements are nearly as strong as the metal when applied in very thin layers, and again to keep leakage down, it is desirable to keep the separation of magnet and armature pole faces as little as possible. When an epoxy cement is applied hot, a layer considerably less than a thousandth of an inch between magnet and pole faces is obtained. To get the right amount of pressure to fasten magnets and armature halves together, it is convenient to first magnetize 16 so that the armature halves are retained to the magnet. After this, to keep armature halves and magnet in axial alignment, the three pieces may be placed on a mandrel having approximately the diameter of the bore 35, or they may be placed inside a metal shell having the I.D. of the housing. Both of these methods, however, have the disadvantage that the mandrel or shell generally gets cemented to the magnet and armature halves and so is difficult to remove. It has been found that the three pieces can be held in close axial alignment by means of a wrapping or two of a thin tough adhesive tape, such as a Mylar tape that is coated with a pressure sensitive adhesive. When the epoxy cement has cured it is relatively easy to remove the tape.

Obviously, the magnet 16 and the pole pieces 45 and 46 should be made as large in diameter as the instrument permits. The reason the magnet should be large in diameter is to get as much of it as possible into the system and to keep the incremental permeability into the armature halves as high as possible. Since the changing unbalanced flux which produces the typical casing joint signal is obliged to pass through at least half the magnet, and since the permeability of Alnico V, the material preferably employed for the magnet is only about four, while the permeability of the armature may be several thousand and that of the casing at least a thousand, it is easy to see that the permeability of the magnet is usually the bottle neck for the changing flux that produces the casing joint signal pulses. Occasionally, when a small diameter detector is centered in large diameter casing, the air gaps of the system are the flux bottle necks but this is not the usual circumstance.

To provide the maximum number of turns of copper of a given size, as well as to keep leakage flux at a minimum, it is desirable to keep the armature sections about which the coils are wound as small in diameter as is consistent with carrying all the flux the magnet is capable of producing without getting saturated. If the armature halves get saturated by the flux of the magnet, the permeability of the armature halves may fall to such a low value that they become the flux bottle necks. Materials such as highly annealed magnetic Armco ingot iron and vanadium Permendur are preferred for the armature halves. Vanadium Permendur will carry about 50% greater flux density than magnetic Armco, but it is much more expensive and harder to machine, and is generally only employed in the most critical circumstances, as in very small diameter instruments.

The preferred proportioning of parts is to make magnet and coil lengths about equal and to keep the overall length less than six inches so that the location of a casing joint can be unambiguously resolved within at least a half foot. While each end of a collar, and sometimes the casing gap between, will generally produce separate pulses, any one of which may be picked as the joint with an error of no more than an inch or two, unfortunately, this is not always the case. For one reason or another, such as lateral motion in the hole, one or more of the possible collar responses may be small or missing entirely so that the best resolution is about limited by the sum of half the collar and detector lengths, hence the desirability of keeping the detector lengths small.

Again, at higher hoisting rates, a single pair of pulses, one in each direction, may be all that get recorded. Due to time constants in the overall system, a given impulsive response of the detector may not get completed before the next one starts. Under these circumstances, what gets recorded is the pulse initiated by the leading magnetic discontinuity and terminated by the trailing discontinuity. The total pulse width will therefore average out to be about equal to half the sum of the detector and magnetic discontinuity lengths. While there may be some exceptions, it is generally the most accurate to use the leading edge of the casing joint pulse as the reference mark for the joint. The reason for this is that the leading edge is necessarily unaffected by what takes place after the pulse starts; moreover, the leading edge of the pulse is much the sharpest, since it is least affected by the time constants of the overall system.

The detector housing 15 is preferably made of stainless steel such as 304, 321 or Armco 17–10P. All of these are non-magnetic types of stainless but the 17–10P is preferred because of its great strength, which requires the least wall thickness. The detector is held in the housing by means of threaded retaining rings 44, as shown, or by some equally good mechanical means.

In Fig. 2, a further improvement in casing joint detectors is shown in cross-sectional arrangement. Like the detector of Fig. 1 it is circularly symmetrical in each and every part and thereby makes effective use of all the space allotted to it. 51 is the non-magnetic housing, made preferably of a strong stainless steel such as Armco 17–10P, 52 is a permanent magnet; 53 and 54 are the two half armatures having coils 55 and 56, respectively, wound about them and connected in series opposition, as before; 57 and 58 are two armature shells which abut poles 59 and 60 of armature halves 53 and 54, respectively, and turn back over to envelop coils 55 and 56, respectively, and become the pole extensions of the respective armature halves. 61 and 62 are the half armature pole faces by means of which the magnet 52 and the armature halves are cemented together at joints 63 and 64. The armature shells 57 and 58 are held to pole pieces 59 and 60 by means of screws 65. The two coils 55 and 56 are interconnected by means of conductor 66, and while terminals are usually provided, as in Fig. 1, they comprise no part of the invention and were left out of Fig. 2 for the sake of brevity. 67 is a conductor by means of which the coil system is connected to cable 31, and 68 is a conductor by means of which the coil system is grounded to housing 51. The detector assembly is held in the housing by means of threaded locking rings 69, or other suitable means.

Figure 9:
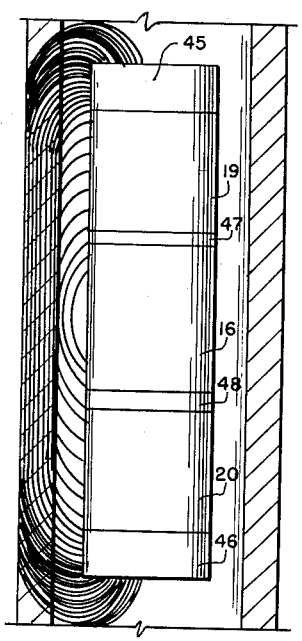
Figure 9 is a drawing, similar to Figure 8, except that it shows the pattern of flux lines for the detector of Fig. 1.

Except for the armature shells, 57 and 58, the construction of the detectors of Figures 1 and 2 are identical and all that has been said in connection with Fig. 1 is equally true of Fig. 2. The principal function served by the shells is that of pole extension, whereby the permeance into the borehole casing is considerably improved so that even with relatively large gaps between detector and casing, not filled with ferromagnetic material, these gaps do not become flux bottle-necks due to the large pole area. This is done without increasing the detector length through the process of inverting the shells or poles back over the armature and coils; indeed, the armature shells actually reduce the effective armature length, over what it actually is, by providing a shorter magnetic path for the flow of magnetic flux into and out of the casing. This can best be seen by comparing Figures 8 and 9. While some flux naturally flows out of and into the shell ends, as seen in Fig. 8, the greatest density of flux flows out and in at points considerably removed from the pole ends. In Figure 9 which is an abbreviated picture of the detector of Fig. 1, we see that practically all of the flux flows in and out of the pole ends. Only a little leakage flux flows through the coils at points inside the ends.

This inversion of the pole extensions is made possible, as before mentioned, by splitting the armature into two equal halves and placing a single magnet between these halves. With magnets located at each end of a one-piece armature it would be impossible to use inverted pole extensions, or shells, without short-circuiting the magnets. This type of an arrangement has been tested for comparison and the theoretical conclusions experimentally verified.

The ideal cross-section for an armature shell would have frustroconical inner surfaces, but for practical reasons the axial cross-section is usually kept rectangular as in Fig. 2. The conical cross-section, while ideal for carrying magnetic flux introduces coil winding difficulties, since if the space is all filled with useful material, the coil cross-section must likewise be conical. However, a conical coil cross-section also has some advantage in bunching the turns near the magnet so that leakage may be thereby reduced under some circumstances, as in large diameter instruments.

The detector of Fig. 2 is shown in relation to streamline or flush joints. 70 and 71 are two sections of casing and 72 is the threaded joint which fastens the two sections together. Whereas, a casing collar, except possibly at the casing gap, provides an improved magnetic flux path, a flush-type joint generally introduces an obstruction to the flux, since it is comprised of a gap without an increased section. This gap is of course very small and has a very large area and so would be more difficult to find than it generally is if it were not for the fact that the threaded casing ends are generally work-hardened, or otherwise purposely hardened, and hence generally have a reduced permeability. In any event, the flush-type joint can generally be considered an impedance to the flow of magnetic flux; hence slightly less flux is able to flow into the lower armature half assembly, Fig. 2, than is able to flow out of the upper armature half assembly. Thus, some flux from the upper assembly must flow into the central region of magnet 52, and this means that more flux links coil 55 than links coil 56 so that if detector assembly 73 is in motion with respect to the casing, as indicated by arrow 74, more voltage will be induced in coil 55 than in coil 56, and hence a net voltage is created in conductor 67 and cable 31.

Figure 5A:
Figures 5A and 5B are signal patterns of a typical two-magnet casing collar detector.
Figure 5B:
Figure 6A:
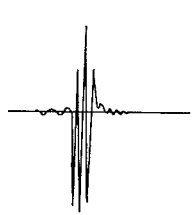
Figures 6A and 6B are signal patterns of the casing collar detector of Fig. 1.
Figure 6B:
Figure 7A:
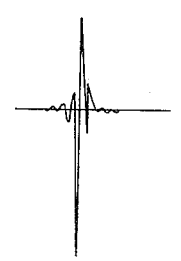
Figures 7A and 7B are signal patterns of the casing collar detector of Fig. 2.
Figure 7B:
Figure 10:
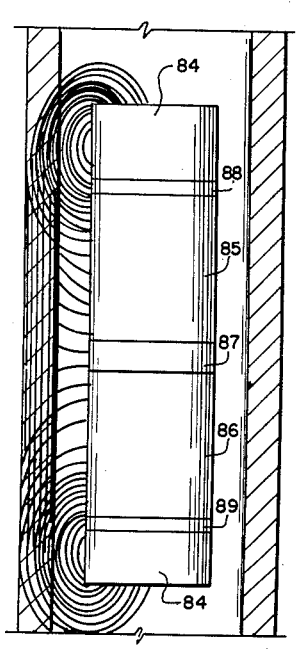
Figure 10 is a drawing, similar to Fig. 8 except that it shows the pattern of flux lines for a two-magnet detector.

Some experimental test results are shown in Figures 5A, 5B, 6A, 6B, 7A and 7B. In Figures 5A and 5B the signal patterns for the detector of Fig. 10 are shown. This detector had a magnet 84 at each end of an armature comprised of coils 85 and 86, central pole piece 87 and pole faces 88 and 89, and a total length of 8¾ inches. Figures 6A and 6B are typical signal patterns for the detector of Figures 1 and 9 and corresponding parts have been given the same reference numerals for proper identification. Figures 7A and 7B show typical signal patterns for the detector of Figures 2 and 8, and again corresponding parts are given the same reference numerals. The patterns of Figures 5A, 6A and 7A are for hoist speeds of 30 feet per minute; while the patterns of Figures 5B, 6B and 7B are for hoist speeds of 10 feet per minute. The maximum amplitude of the main peaks of Figures 6A and 7A is not reached due to the operation of the AVC system in the amplifier so that the relative amplitudes are not proportionately portrayed. The purpose of the illustrations is largely to show the difference in pattern widths and signal complexities obtained with the three detectors. It is readily seen that the single-magnet split armature detector of Fig. 1 is a considerable improvement over the two-magnet detector, as far as signal pattern width and complexity are concerned and, therefore, an improvement in the accuracy with which collars and casing joints can be located. What this means in location accuracy can perhaps best be seen by referring to Table I, where the signal pattern widths in feet of well are given, together with the amplitude ratio of the main central spikes of the signal pulses to the skirting wavelets. Since the accuracy with which collars can be located will be determined largely by the length of the predominating central spikes, it is seen that an improvement in collar resolution of at least 4:1 has been made.

Table I

| Detector Identification | Overall Signal Pattern Lengths in Feet of Well | Signal Pattern Lengths not Including Skirts, Feet of Well | Ratio of Signal Amplitudes of Central Spikes to Skirts |
| --- | --- | --- | --- |
| Fig. 10 | 0.91 | 0.91 | |
| Figs. 1 and 9 | 0.77 | 0.17 | 6 |
| Figs. 2 and 8 | 0.63 | 0.24 | 10 |

Referring now more explicitly to the flux patterns exhibited by Figures 8 through 13, there is first illustrated, in Figures 8, 9 and 10, the approximate flux patterns of the three casing joint detectors with which we have been most particularly concerned as they would be in uniform casing. In Fig. 8, the flux pattern for the detector of Fig. 2 is illustrated. There are a few lines of leakage about the central magnet, and the number of lines increases as the shells are reached, but the greatest density of flux flows out of or into the shells somewhat short of the ends. The pattern is perfectly symmetrical so that the flux linking each coil is the same. It can also be seen that the leakage flux being centrally located, the alteration thereof will not appreciably affect the flux linking the coils; moreover, by the time a magnetic anomaly reaches the central portion, to alter the flux there, signals indicating the presence of this anomaly, due to intercepting some of the flux in the high density region near one end, will already have been transmitted, and it no longer matters particularly what the central leakage flux does.

Figure 9 shows the flux pattern for the detector of Fig. 1, and it is quite similar to the flux pattern of Fig. 8. The main difference is that the greatest density of flux is in the vicinity of the pole pieces 45 and 46; hence this detector will have an effective length somewhat greater than the detector of Figures 2 and 8, as heretofore stated. Also because of this greater effective length, and because the coils are not magnetically shielded, there will be somewhat more leakage through the coils and hence a greater opportunity to produce skirting wavelets of a significant size.

Comparing Figures 8 and 9 to Figure 10, which shows the flux pattern of a two-magnet detector, it is seen that there is a considerable amount of leakage flux about each magnet in Figure 10, and the interception of this flux will cause more or less flux to link one or other of the coils of the detector. The result is that signals are produced when a magnetic anomaly is located near one magnet or the other, rather than when the anomaly is located somewhat between the coils. The result is that this detector often produces two rather widely separated pulse patterns for each anomaly.

Figure 11:
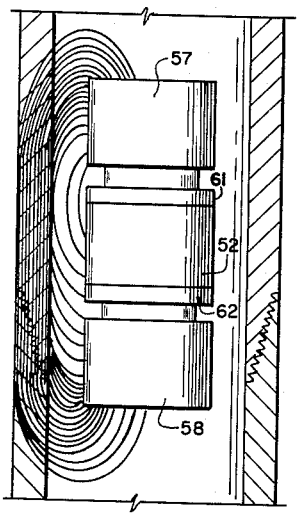
Figure 11 is a drawing in partial cross-section illustrating the pattern of flux lines when the detector of Fig. 2 is situated within a cased borehole and a flush casing joint is located near the bottom detector coil.
Figure 12:
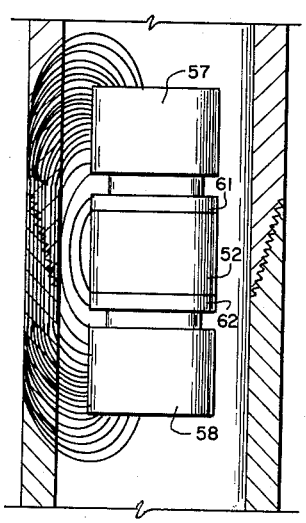
Figure 12 is a drawing, similar to Fig. 11, except that the flush casing joint is centered on the magnet.
Figure 13:
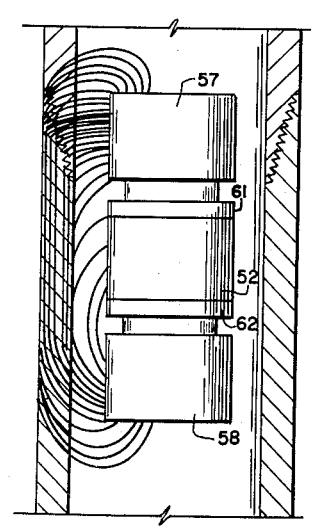
Figure 13 is a drawing, similar to Fig. 11, except that the flush casing joint is now located near the upper detector coil.

Figures 11, 12 and 13 show the flux patterns for the detector of Fig. 2 with a casing joint first near one end, then centralized and finally nearer the other end. When the joint is centralized the pattern is symmetrical and this is indicative of the fact that equal flux is linking both coils and hence that the induction is zero. When the casing joints are nearer one end than the other, the flux patterns are not symmetrical, with respect to the coils, and hence one coil or the other has more flux linkage. With the joint near the bottom end of the detector, the flux pattern is pushed down toward the bottom, due to the obstruction presented by the joint, and hence the upper coil gets the greatest flux linkage. With the joint near the top of the detector the opposite takes place.

Figure 3:
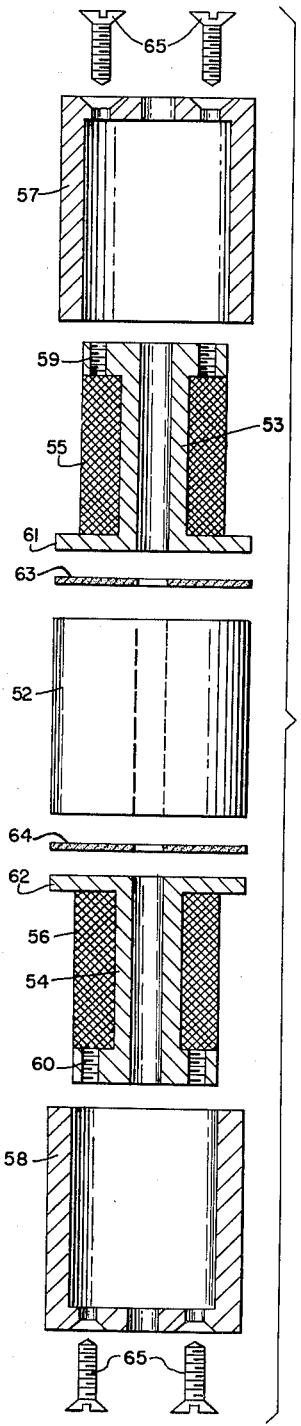
Figure 3 is an exploded view of the preferred form of the casing joint and collar detector of the present invention showing in simple detail the five basic parts and six screws which comprise the detector.

Figure 3 is an exploded drawing showing all of the vital parts which comprise the preferred form of casing joint detector. As in Fig. 2, 52 is the central magnet, 55 and 56 are the two coils, 59 and 60 are the pole pieces, and 61 and 62 the pole faces of the armature halves 53 and 54, 57 and 58 are the armature shells, 63 and 64 the very thin sheets of cement which hold magnet and armature halves together, and 65 indicates the screws, three on each end which hold the armature shells to the armature poles. This is the simplest possible mechanical form that a magnetic type of casing joint detector can take and the most ideal yet found and tested. It has all the features, qualities and properties heretofore given and in addition to that an extremely high signal-to-noise ratio.

Noise in a casing joint detector, as in other devices, is the response to undesired variations. In a casing joint detector noise is generally the response produced by lateral motion in a borehole, as when the instrument swings back and forth, rolls around on the inside surface of the casing, or more particularly when the instrument jumps as when it hits a rough spot in the casing or a piece of cement which has adhered to the casing walls. The casing joint detectors of the prior art have balance to unbalance ratios of about 1.5 to 10; whereas, the detectors of the present invention have balance to unbalance ratios ranging from 27 to 101. A balance to unbalance ratio is determined in the following way. The detector is placed an inch or two from a long cylindrical mandrel of non-magnetic material, with the axes of detector and mandrel parallel and with the mandrel ends far removed from the detector ends. Using a motor and gear box the mandrel is adapted for rotation. For the balance condition, a long steel bar approximately the same length as the mandrel is attached to the mandrel so that as the mandrel rotates the long steel bar moves periodically closer and then further from the detector. This simulates lateral motion in the borehole. For the unbalanced condition, simulating a collar, a half-bar is attached to the rotating mandrel; i.e., a bar having the same cross-section as the first bar but half the length. One end of this bar is, as before, located far from the end of the detector, but the other end then falls opposite to the center of the detector. The balance to unbalance ratio is the ratio of the signal amplitudes thus obtained and is, therefore, a measure of the detector's ability to respond to the unsymmetrical conditions typical of casing joints in preference to all symmetrical magnetic situations. It is seen that the detector of the present invention is highly superior in its ability to respond to collars and other forms of casing joints but not to respond to other variations occurring in a borehole.

Again, the detectors of this invention can be wound with a few turns of heavy wire for those applications where it is desirable to record the signal directly, or they may be wound with many turns of fine wire for those applications where it is desirable to use amplification. The only requirement is that all the space allotted to the windings be filled with copper and none of it wasted. If this is done and if all of the other spaces are filled with magnet or with iron, and optimum proportions maintained throughout the detector will have the ultimate in performance characteristics at all times.

Numerous other variations and modifications may, obviously, be made without departing from the invention. Accordingly, it should be clearly understood that those forms of the invention described above and shown in the figures of the accompanying drawings are illustrative only and are not intended to limit the scope of the invention.

I claim:

1. Apparatus adapted to be moved through a borehole for locating the joints between sections of steel casing lining said borehole comprising permanent magnet means; substantially identical armature means disposed in magnetic contact with each pole of said magnet means, each of said armature means comprising a magnetically soft core having a face in substantial contact with said magnet means, said face being substantially coextensive with the adjacent surface of said magnet means, magnetically soft pole means spaced from said face, and coil means disposed on said core between said pole means and said face; means providing a magnetic flux path from said magnet means including both of said armature means and a portion of said casing; means connecting said coil means differentially to provide for the induction of net voltage only when said casing portion is magnetically asymmetrical with respect to said armature means; and means operatively associated with said coil means for recording said voltage as a function of the depth of said armature means in said borehole.

2. Apparatus, as in claim 1, in which said armature means and said magnet means are arranged in substantially axial alignment, and said magnet means comprises a permanent magnet magnetized parallel to the axis of alignment.

3. The apparatus of claim 1 wherein said pole means comprise generally cup-shaped members overlying said coil means.

4. The apparatus of claim 1 wherein the coil means of one of said armature means are connected in series with the coil means of the second of said armature means in such a way that the currents induced in said coil means will be in opposing relation.

5. In apparatus for detecting joints between sections of casing lining a borehole, the combination comprising a housing adapted to be lowered in a borehole, a permanent magnet within said housing and conforming to the shape thereof, two armature halves in the housing separated by said magnet, each of said armature halves provided with face portions of magnetically soft material attached to said magnet and being substantially coextensive with the adjacent surface of said magnet for receiving and transmitting flux from and into said magnet, each of said armature halves being provided with pole means of magnetically soft material separated from said face portion by cores of magnetically soft material continuous with but having a smaller diameter than said face portions and pole means, said face portion, pole means and magnet having diameter substantially equal to the inside diameter of the housing, substantially identical coil means upon said cores substantially filling the spaces between respective face portions and pole means not occupied by said cores, means connecting said coil means in series opposition, and means for indicating the net voltage induced in said coil means as a function of the depth of said armature halves in the borehole.

6. The apparatus of claim 5 wherein said pole means comprise generally cylindrical shell members formed of ferromagnetic material and having portions thereof overlying said coil means and extending into relatively close proximity to said magnet means.

7. In apparatus for detecting joints between sections of casing lining a borehole, the combination comprising a cylindrical housing adapted to be lowered in a borehole on and operate from a supporting cable; a permanent magnet within said housing; two armature halves in the housing separated by said magnet, each of said armature halves being provided with face portions of magnetically soft material attached to said magnet and being substantially coextensive with the adjacent surfaces of said magnet for receiving and transmitting flux from and into said magnet and pole means of magnetically soft material separated from said face portions by cores of magnetically soft material continuous with but having smaller cross-sections than said face portions and pole means; coils upon said cores substantially filling the spaces between respective face portions and pole means not occupied by said cores; means connecting said coils in series opposition and to at least one conductor and the sheath of said cable; and means for indicating the net voltage induced in said coils as said housing and contents are moved through said borehole.

8. A casing joint detector comprising a permanent magnet; substantially identical armature halves disposed on each pole of said magnet, each of said armature halves having a portion of magnetically soft material adapted for attachment to said magnet and being substantially coextensive with the adjacent surfaces of said magnet for receiving and transmitting flux from and into said magnet, pole means of magnetically soft material separated from said face portion, and a core of magnetically soft material continuous with but having a smaller diameter than said face portions and pole means, substantially identical coils wound upon said cores substantially to fill the spaces between said face portions and said pole means not occupied by said cores; and means for connecting said coils in series opposition.

9. The apparatus of claim 8 wherein said pole means comprise generally cup-shaped members formed of ferromagnetic material and having portions thereof overlying said coil means and extending into relatively close proximity to said magnet means.

10. The apparatus of claim 9 wherein said pole means are formed with a cylindrical outer surface and with the inner surfaces converging to the closed end of said pole means, said coil means being wound on said armature means in the form of a truncated cone to substantially fill the space within said pole means.

11. A casing joint detector comprising a housing, permanent magnet means arranged axially within said housing and having opposite magnetic poles at opposite ends of said magnet means, core means having face portions in substantial contact with said poles and substantially coextensive with the adjacent surfaces of said magnet means, a plurality of coils located within said housing, said coils being disposed about said core means and spaced longitudinally from and in axial alignment with said magnet means, said coils and core means and magnet means being secured in said housing in firm contact with one another to assure complete and continuous contact of said components of the magnetic circuit.

12. A casing joint detector comprising a housing, permanent magnet means located within said housing and extending axially thereof, a first coil located in said housing adjacent one end of said magnet means and arranged in axial alignment with said magnet means, a second coil located in said housing adjacent the opposite end of said magnet means and arranged in axial alignment with said magnet means, and magnetically soft core members extending through said coils in axial alignment therewith and having face portions in substantial contact with adjacent surfaces of said magnet means and substantially coextensive therewith and serving to link said coils with flux from said magnet means.

13. A casing joint detector comprising a housing, permanent magnet means located within said housing and extending axially thereof, a magnetically soft first core member located adjacent the north pole of said magnet means and extending in axial alignment with said magnet means, a first coil wound about said first core member, said first core member having a relatively thin face portion substantially coextensive with the adjacent surface of said north pole for attaching said first core member to said magnet means and serving to link said first coil with flux from said magnet means, a magnetically soft second core member located adjacent the south pole of said magnet means and extending in axial alignment with said magnet means, a second coil wound about said second core member, said second core member having a relatively thin face portion substantially coextensive with the adjacent surface of said south pole for attaching said second core member to said magnet means and serving to link said second coil with flux from said magnet means, and means connecting said coils in opposing relation.

14. A casing joint detector comprising a housing, permanent magnet means located within said housing and extending axially thereof, a magnetically soft first core member located adjacent the north pole of said magnet means and extending in axial alignment with said magnet means, a first coil wound about said first core member, said first core member having a relatively thin face portion substantially coextensive with the adjacent surface of said north pole to link said first coil with flux from said magnet means, a magnetically soft second core member located adjacent the south pole of said magnet means and extending in axial alignment with said magnet means, a second coil wound about said second core member, said second core member having a relatively thin face portion substantially coextensive with the adjacent surface of said south pole to link said second coil with flux from said magnet means, and generally cup-shaped pole pieces secured to the extremities of said core members and overlying about the outer windings of said coils.

References Cited in the file of this patent
UNITED STATES PATENTS

| | | |
|---|---|---|
| 2,259,904 | McNamee | Oct. 21, 1941 |
| 2,508,494 | Cook et al. | May 23, 1950 |
| 2,527,170 | Williams | Oct. 24, 1950 |
| 2,542,893 | Bender | Feb. 20, 1951 |
| 2,558,427 | Fagan | June 26, 1951 |
| 2,869,072 | Gieske | Jan. 13, 1959 |